United States Patent Office 3,344,918
Patented Oct. 3, 1967

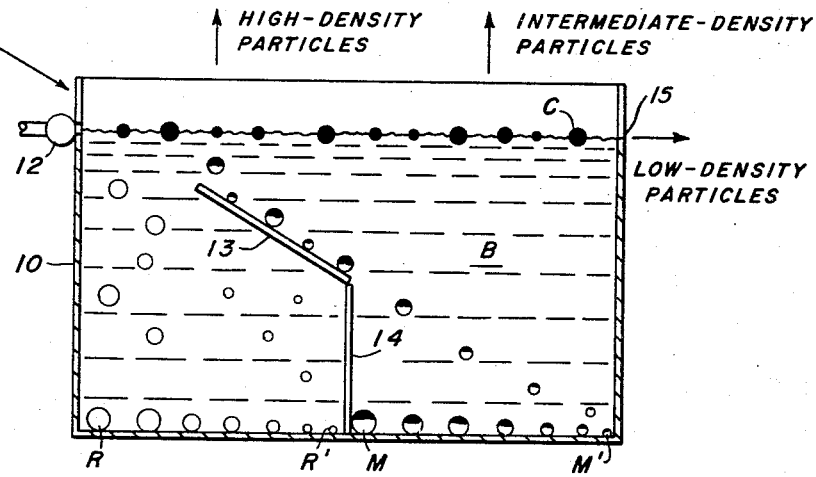
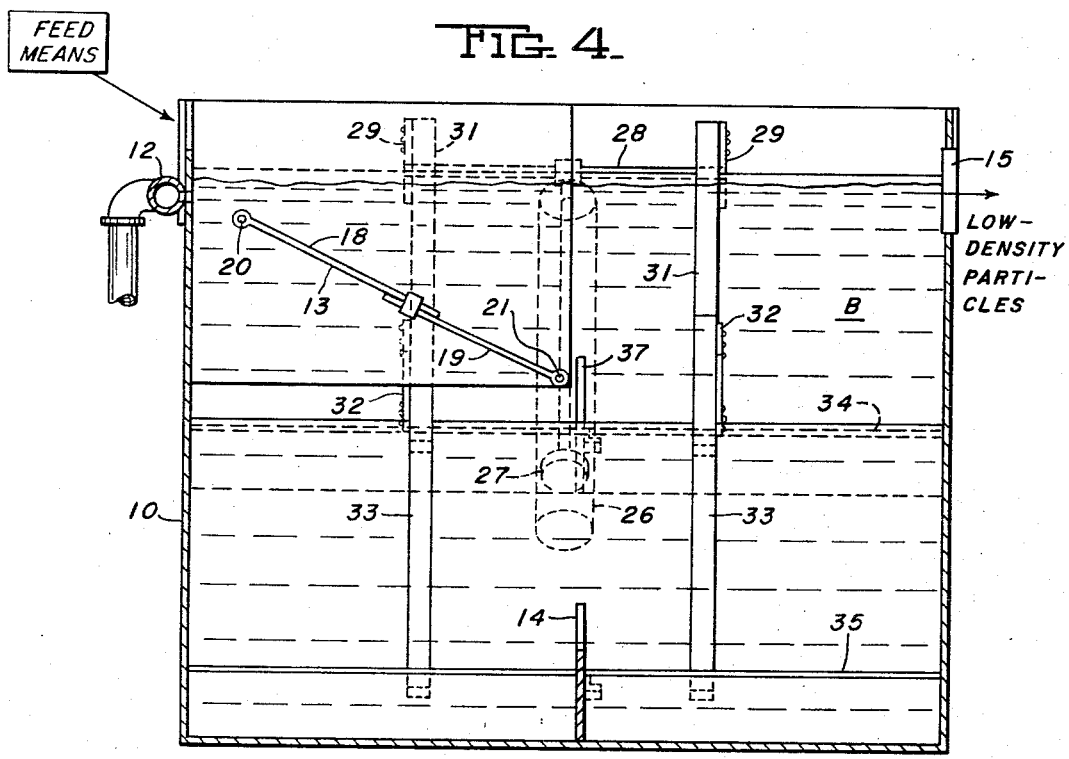

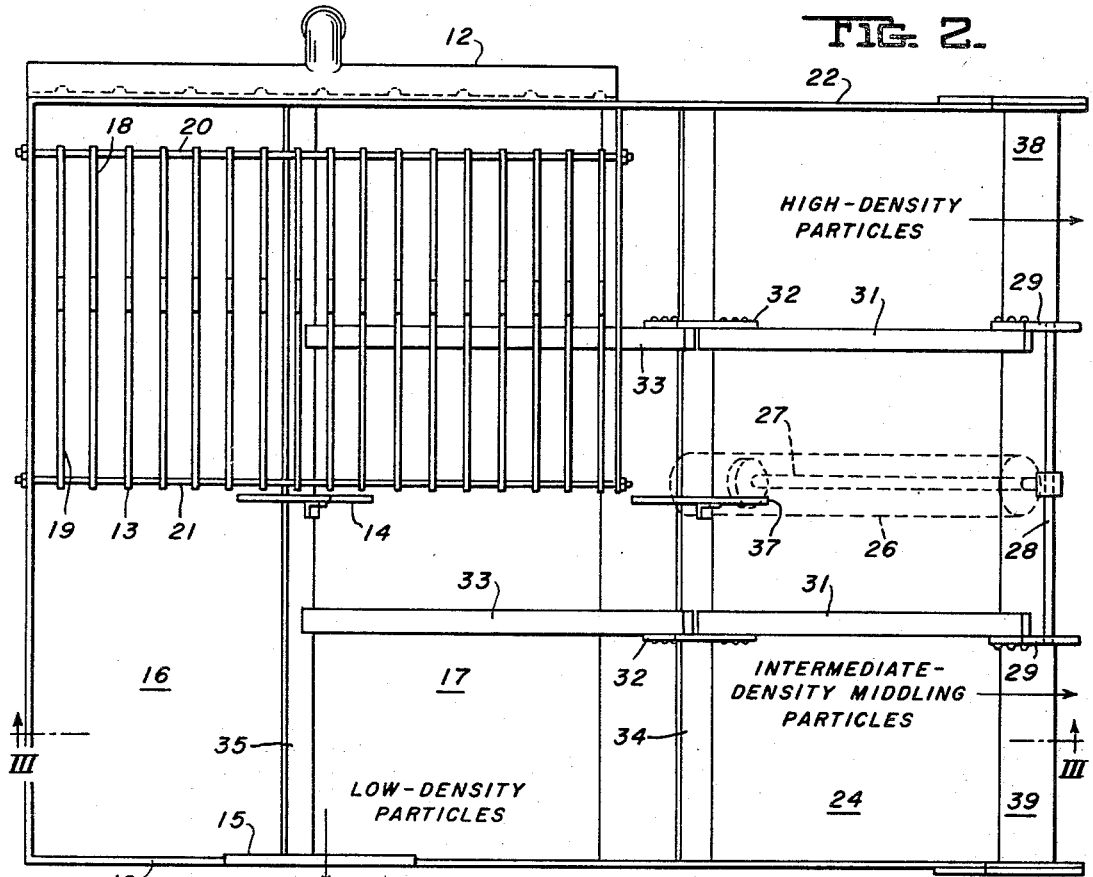
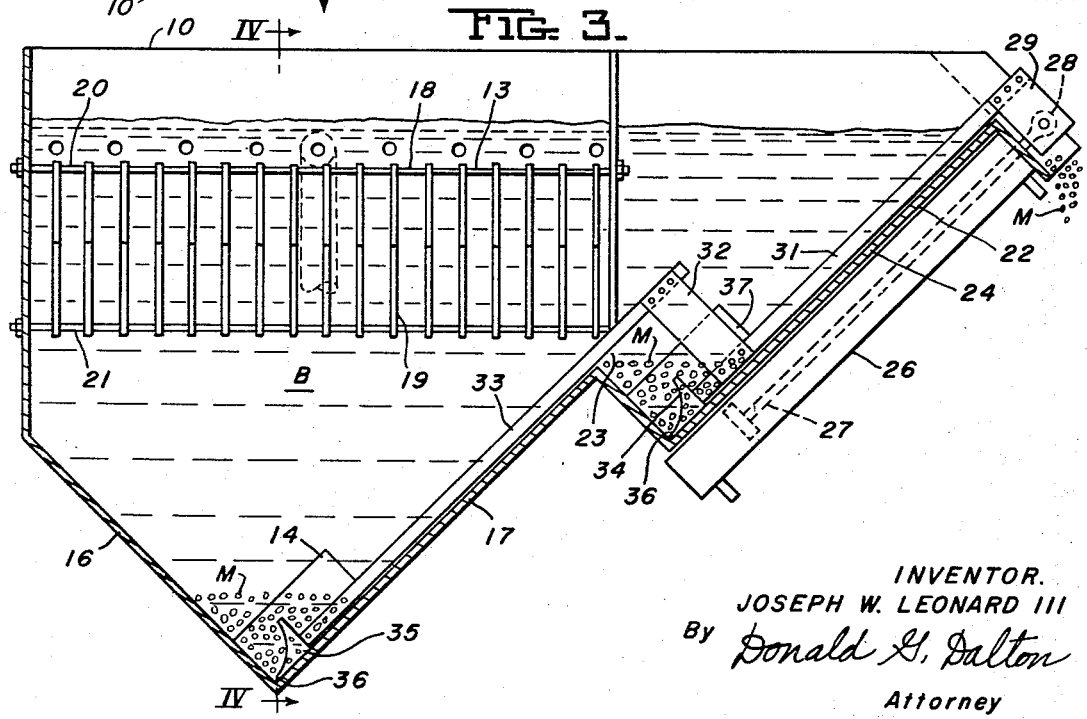

3,344,918
HEAVY-MEDIUM METHOD AND APPARATUS
Joseph W. Leonard III, Morgantown, W. Va., assignor to United States Steel Corporation, a corporation of Delaware
Continuation of abandoned application Ser. No. 248,605, Dec. 31, 1962. This application Nov. 10, 1965, Ser. No. 520,811
10 Claims. (Cl. 209—12)

This application is a continuation of my earlier application Ser. No. 248,605, filed Dec. 31, 1962, now abandoned.

This invention relates to an improved method and apparatus for heavy-medium separation of minerals.

In a conventional heavy-medium process, mineral particles are introduced to a vessel which contains a medium of specific gravity intermediate that of the values and refuse in the mineral. Commonly the medium is a water suspension of finely divided recoverable solids, such as magnetite, ferrosilicon or barite. If the mineral is coal, the values float while the refuse sinks. The reverse occurs with most ores, such as iron ore. Most minerals include a substantial number of middling particles, which can be recovered with either the values or the refuse, depending on the exact specific gravity of the medium. The presence of middlings in the values lowers the grade of the product, but middlings represent an economic loss if discarded with the refuse. Therefore middlings desirably are recovered as a separate product which can be used where a high grade product is not required or which can be further ground and re-concentrated. Most heavy-medium separating vessels are constructed to recover only two products. Hence an additional treating step is required if middlings are separated from values or refuse.

An object of the present invention is to provide an improved heavy-medium separating method and apparatus which in a single operation separate mineral particles into three products, including a middling product, as well as values and refuse.

A further object is to provide an improved method and apparatus of the foregoing type which separate the sink product into two fractions depending on the relative size and settling rate of the particles, one of said fractions being a middling product.

A further object is to provide an improved separating apparatus which achieves the foregoing purposes, yet is of simple construction and readily adjustable for changing conditions.

In the drawings:
FIGURE 1 is a diagrammatic vertical sectional view which illustrates the principles of my invention;
FIGURE 2 is a top plan view of a separating apparatus constructed in accordance with my invention;
FIGURE 3 is a vertical section on line III—III of FIGURE 2; and
FIGURE 4 is a vertical section on line IV—IV of FIGURE 3.

FIGURE 1 shows diagrammatically a vessel 10 to which mineral particles (for example impure coal) are introduced from the upper left end. The particles travel in a path which has a horizontal component. The particles have a range of sizes and among them are relatively low-density particles, relatively high-density particles, and intermediate-density middling particles. The vessel contains a heavy-medium bath B of a specific gravity sufficient to float low-density particles, but in which both middlings and high-density particles sink. The medium is introduced continuously to the vessel from a manifold 12 located just below the line along which the mineral particles are introduced. Thus the medium continuously flows through the vessel from left to right. A downwardly-sloping grid 13 is mounted within the vessel spaced from both ends. A vertical partition 14 extends across the vessel beneath the lower end of the grid.

Low-density particles C (for example pure coal particles) float on the bath surface and flow with the medium over a weir 15 at the right end, where they are recovered. Larger high-density particles R (for example coal refuse particles) have the most rapid settling rate, and they sink before reaching the grid and accumulate at the bottom of the vessel adjacent the feed end. Smaller high-density particles R' and larger middling particles M settle together more slowly, and flow with the medium to a region over the grid before sinking. Particles R' pass through the grid and accumulate at the bottom of the vessel between particles R and partition 14. The grid retains particles M and they travel down the slope and accumulate at the bottom of the vessel beyond the partition. Smaller middling particles M' settle still more slowly and flow with the medium beyond the grid and accumulate at the bottom of the vessel between particles M and the far end. Thus I can recover the large and small high-density particles R and R' as a first sink product at the left of partition 14, and the large and small middling particles M and M' as a second sink product at the right.

FIGURES 2, 3 and 4 show in more detail how I actually may construct the apparatus shown diagrammatically in FIGURE 1. The vessel 10 is rectangular in plan and it has two bottom wall sections 16 and 17 which slope downwardly toward the center from its side walls. Grid 13 includes telescoping upper and lower sections 18 and 19 which I can adjust relatively to each other to vary the grid length. I support the grid on upper and lower bars 20 and 21 which extend across the vessel and are fixed to its side walls in any convenient manner to permit adjustment. I mount an auxiliary vessel 22 on one side of vessel 10 at the top of the sloping wall section 17. An opening 23 above wall section 17 furnishes communication between the two vessels. Vessel 22 has a sloping bottom wall 24, which lies in a plane parallel with wall section 17 of vessel 10.

The apparatus includes a device for transferring both sink products from vessel 10 to the auxiliary vessel 22 and then removing these products from the latter vessel. This device includes a double-acting fluid pressure cylinder 26 fixed to the underside of wall 24, a reciprocable piston and piston rod 27 mounted in the cylinder, and a yoke 28 attached to the upper end of the piston rod. Opposite ends of the yoke carry upstanding brackets 29. Upper bars 31 are fixed to the respective brackets 29 and overlie the sloping wall 24. Respective brackets 32 are fixed to bars 31 near their lower ends and carry respective lower bars 33 which overlie the sloping wall section 17. The lower ends of the upper bars 31 carry an upper scraper 34, and the lower ends of the lower bars 33 carry a lower scraper 35. The scrapers 34 and 35 ride against walls 24 and 17 respectively. Preferably the lower ends of the scrapers have sharp edges 36 to enable the scrapers to penetrate accumulations of sink particles at the bottoms of the vessels as they move downwardly. Partition 14 is mounted on the lower scraper 35 to separate middlings and high-density particles, and a similar partition 37 is mounted on the upper scraper 34. I can adjust partitions 14 and 37 lengthwise of the respective scrapers to align them with the lower edge of grid 13.

In operation, the apparatus shown in FIGURES 2, 3 and 4 separates mineral particles into three products in the same manner as described for FIGURE 1. High-density particles R and R' accumulate in the bottom of vessel 10 to the left of partition 14 and middlings M and M' to the right, as viewed in FIGURE 4. I adjust the length of grid 13 and the positions of partitions 14 and 37 to achieve a sharp separation. The piston and piston rod 27 continually reciprocate slowly up and down in cylinder 26. During a downstroke the two scrapers 34 and 35 penetrate accumulations of sink particles in vessels 22 and 10. During an upstroke these scrapers drag the particles up the sloping walls 17 and 24. Particles dragged from vessel 10 pass through the opening 23 into vessel 22, while particles dragged from the latter vessel discharge over weirs 38 and 39. The parts move slowly in order not to agitate the bath B and thus disturb the settling pattern.

From the foregoing description it is seen that my invention affords a heavy-medium method and apparatus of simple operation and construction for separating minerals into three products, one a float product and the other two sink products. Thus the invention overcomes the need for an additional operation to separate middlings from values or refuse. For purposes of illustration, I describe the method and apparatus as used with coal. Thus the float product contains the values and the first sink product the refuse. Nevertheless, I do not intend to limit the invention in this respect, since the method and apparatus can be used equally well with ores in which the first sink product contains the values and the float product the refuse.

While I have shown and described preferred embodiments of my invention, it is apparent that other modifications may arise. Therefore, I do not wish to be limited to the disclosure set forth but only by the scope of the appended claims.

I claim:

1. A heavy-medium minerals separation method comprising introducing to one end of a vessel mineral particles of a range of sizes, among which are relatively low-density particles, relatively high-density particles, and intermediate-density middling particles, separately introducing to the same end of the vessel below the mineral particles a liquid medium, said mineral particles and said medium moving in paths which have horizontal components as they enter the vessel, said medium being of a specific gravity to float the low-density particles, but in which larger high-density particles settle rapidly adjacent the end where they are introduced, smaller high-density particles and larger middling particles settle together more slowly in a region spaced from the end where they are introduced, and smaller middling particles settle still more slowly in a region still farther from the end where they are introduced, continuosly separating small high-density particles from large middling particles according to size as they settle in the same region, recovering low-density particles as a float product, recovering large and small high-density particles as a first sink product, and recovering large and small middlings as a second sink product.

2. A method as defined in claim 1 in which the particles introduced to the vessel are impure coal, the low-density particles are pure coal, and the high-density particles are coal refuse.

3. A method as defined in claim 1 in which the sink products are continually dragged from the vessel by a reciprocating movement without disturbing the settling pattern of the particles.

4. A heavy-medium minerals separation apparatus comprising a vessel, means for introducing to one end of said vessel mineral particles of a range of sizes, among which are relatively low-density particles, relatively high-density particles, and intermediate-density middling particles, separate means below said first-named means for introducing to the same end of said vessel a continuous flow of a liquid medium, said first- and second-named means imparting horizontal components to the movement of the particles and medium entering said vessel, said medium being of a specific gravity sufficient to float the low-density particles, but in which larger high-density particles settle rapidly adjacent the end where they are introduced, smaller high-density particles and larger middling particles settle together more slowly in a region spaced from the end where they are introduced, and smaller middling particles settle still more slowly in a region still farther from the end where they are introduced, means in said vessel for separating small high-density particles from large middling particles according to size as they settle in the same region, means for recovering low-density particles as a float product, means for recovering large and small high-density particles as a first sink product, and means for recovering large and small middlings as a second sink product.

5. An apparatus as defined in claim 4 in which the means for separating particles according to size includes a grid mounted in said vessel and sloping downwardly from the end thereof at which the particles are introduced and being spaced from both ends, said grid passing small high-density particles and retaining large middling particles.

6. A heavy-medium minerals separation apparatus comprising a vessel, means for introducing to one end of said vessel mineral particles of a range of sizes, among which are relatively low-density particles, relatively high-density particles, and intermediate-density middling particles, means for introducing to the same end of said vessel a continuous flow of a liquid medium of a specific gravity sufficient to float the low-density particles, but in which larger high-density particles settle rapidly adjacent the end where they are introduced, smaller high-density particles and larger middling particles settle together more slowly in a region spaced from the end where they are introduced, and smaller middling particles settle still more slowly in a region still farther from the end where they are introduced, a grid mounted in said vessel and spaced from both ends and sloping downwardly from the end at which particles are introduced, a partition in said vessel beneath the lower end of said grid, said grid passing small high-density particles and directing them to one side of said partition and retaining large middling particles and directing them to the other side of said partition to effect a separation according to size between the small high-density particles and the large middling particles as they settle together in the same region, means for recovering low-density particles as a float product, means for recovering large and small high-density particles as a first sink product, and means for recovering large and small middling particles as a second sink product.

7. An apparatus as defined in claim 6 in which said grid is adjustable in length and the position of said partition is adjustable.

8. An apparatus as defined in claim 6 in which said vessel has sloping bottom wall sections, and the means for recovering the high-density particles and middling particles includes an auxiliary vessel mounted on said first-named vessel and communicating therewith above one of said wall sections and having a sloping wall parallel with said last-named wall section, scrapers mounted in the respective vessels for travel up and down the parallel sloping walls, the scraper in said first-named vessel being adapted to transfer particles to said auxiliary vessel, the scraper in said auxiliary vessel being adapted to remove particles from the apparatus, respective partitions mounted on said scrapers and a reciprocating drive operatively connected with said scrapers.

9. An apparatus as defined in claim 8 in which said scrapers have sharp lower edges to penetrate accumulations of particles in said vessels, and said drive includes a double-acting fluid pressure cylinder mounted on the underside of the sloping wall of said auxiliary vessel, a reciprocable piston and piston rod in said cylinder, and a yoke and bars connecting the piston rod and scrapers.

10. A heavy-medium minerals separation apparatus comprising a vessel having bottom wall sections sloping from both sides to the longitudinal center, an auxiliary vessel mounted on said first-named vessel and communicating therewith above one of said wall sections and having a sloping wall parallel with said last-named wall section, means for introducing to one end of said first-named vessel mineral particles of a range of sizes, among which are relatively low-density particles, relatively high-density particles, and intermediate-density middling particles, means for introducing to the same end of said first-named vessel a continuous flow of a liquid medium of a specific gravity sufficient to float the low-density particles, but in which larger high-density particles settle rapidly adjacent the end where they are introduced, smaller high-density particles and larger middling particles settle together more slowly in a region spaced from the end where they are introduced, and smaller middling particles settle more slowly in a region still farther from the end where they are introduced, a downwardly-sloping grid mounted in said first-named vessel in the region where the smaller high-density and larger middling particles settle, said grid passing the smaller particles and retaining the larger particles, scrapers mounted in the respective vessels for travel up and down the parallel sloping walls, respective partitions mounted on said scrapers in alignment with the lower edge of said grid for separating settled high-density particles from the middling particles in the two vessels, and a reciprocating drive operatively connected with said scrapers, said first-named vessel having an overflow weir at the end opposite that where particles are introduced for discharging low-density particles and medium, said auxiliary vessel having discharge weirs at the top of its sloping wall for discharging high-density and middling particles, the scraper in said first-named vessel being adapted to transfer particles to said auxiliary vessel, the scraper in said auxiliary vessel being adapted to remove particles over said second-named weirs.

References Cited

UNITED STATES PATENTS

| | | | |
|---|---|---|---|
| 763,019 | 6/1904 | Phinney | 209—17 |
| 2,431,984 | 12/1947 | Bean | 209—17 |
| 2,491,912 | 12/1949 | Walker | 209—173 X |

FOREIGN PATENTS

| | | |
|---|---|---|
| 120,404 | 9/1877 | France. |
| 416,978 | 3/1924 | Germany. |
| 661,897 | 5/1936 | Germany. |

HARRY B. THORNTON, *Primary Examiner.*

R. HALPER, *Assistant Examiner.*